United States Patent
Harrell

(10) Patent No.: US 6,854,990 B2
(45) Date of Patent: Feb. 15, 2005

(54) MODULAR ELECTRICAL CORD SHIELD SYSTEM

(76) Inventor: W. Randy Harrell, P.O. Box 3310, Temple, TX (US) 76505

( * ) Notice: Subject to any disclaimer, the term of this patent is extended or adjusted under 35 U.S.C. 154(b) by 52 days.

(21) Appl. No.: 10/306,351

(22) Filed: Nov. 27, 2002

(65) Prior Publication Data

US 2004/0102080 A1 May 27, 2004

(51) Int. Cl.$^7$ .............................. H01R 13/44
(52) U.S. Cl. ..................................... 439/135
(58) Field of Search ................ 174/135, 136; 439/502, 590, 713, 717, 937

(56) References Cited

U.S. PATENT DOCUMENTS

| | | | |
|---|---|---|---|
| 4,609,248 A | | 9/1986 | Haase |
| 5,130,496 A | * | 7/1992 | Jenkins .................. 174/135 |
| 5,397,243 A | * | 3/1995 | MacMurdo, Sr. .......... 439/136 |
| 6,033,251 A | | 3/2000 | Cook |
| 6,059,613 A | * | 5/2000 | Feher et al. ............... 439/713 |
| 6,240,967 B1 | | 6/2001 | Levert et al. |
| 6,301,752 B1 | | 10/2001 | Koppang |

* cited by examiner

*Primary Examiner*—Khiem Nguyen
(74) *Attorney, Agent, or Firm*—David G. Henry

(57) ABSTRACT

A modular electrical cord shield system, including snap-together cord shield segments through a central channel of which an electrical cord extends. Successive segments are joined to shield electrical cords of varying length by male and female junction structures at ends of each cord shield segment.

2 Claims, 3 Drawing Sheets

MODULAR ELECTRICAL CORD SHIELD SYSTEM

BACKGROUND OF THE INVENTION

1. Field of the Invention

The present invention relates to child protection products.

2. Background Information

Each and every year, numerous children are injured through accidental interaction with electrical cords and sockets. One source of danger for children (and pets, for that matter) relates to chewing of electrical cords. With but a little persistence, a child or pet can chew through the insulation on a household electrical cord in surprisingly little time. Of course, direct contact between a wet mouth and electricity will almost surely have catastrophic consequences.

Few, if any, practical measures for protecting children (and pets) from the dangers of electrical cords as described above are available. Clearly, electrical cords could be made to be virtually impenetrable, but to do so would raise costs of all appliances and extension cords, in order to protect only a relatively small portion of the consuming population. However laudable and justifiable such a measure would be, manufacturers would surely resist any requirement of this nature, based on economic grounds. Furthermore, any new such measure would not address the millions of existing, unprotected cords.

Consumers might somehow add layers of protection, such as by further wrapping cords with, for example, duct tape. However, measures such as these are of questionable efficacy, are unattractive, and are difficult to reverse once the need passes (as the child or pet grows beyond the chewing stage).

It would well-serve society as a whole to provide a vital protection to its young children (and secondarily, of course, to its pets) in relation to chewing of electrical cords. Ideally, such a protective measure would, in addition to providing effective protection, involve articles that could be added to existing, standard electrical cords, and which could be removed once no longer needed.

SUMMARY OF THE INVENTION

In view of the above, it is an object of the present invention to provide a protective shield for electrical cords.

It is another object of the present invention to provide a child protective shield for electrical cords, which shield is readily added to, and removed from existing electrical cords.

It is another object of the present invention to provide a child protective shield for electrical cords, which shield is adaptable to varying lengths of electrical cord.

DETAILED DESCRIPTION OF THE PREFERRED EMBODIMENT

Figure 1:
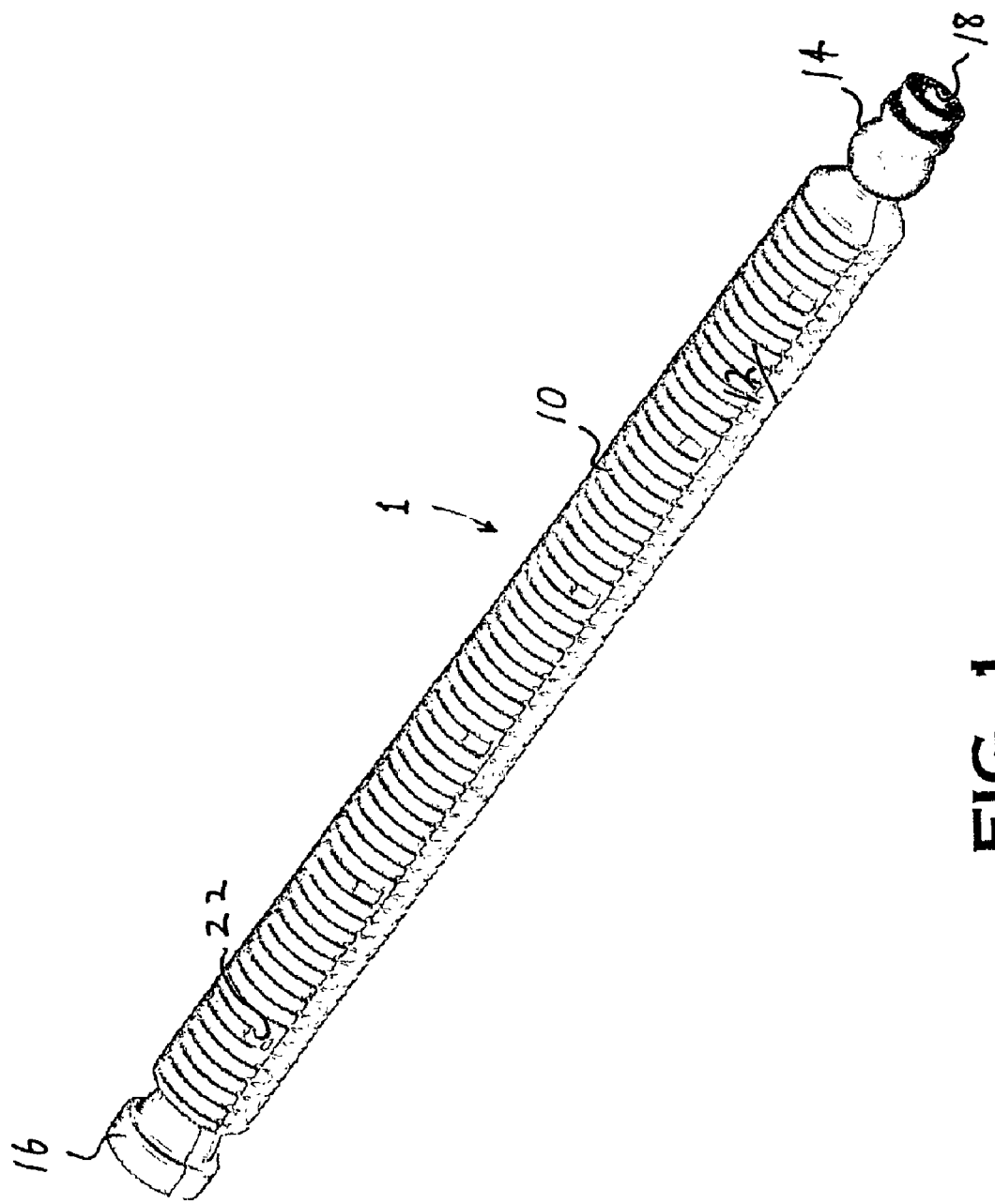
FIG. 1 is a perspective view of one cord shield segment of the preferred embodiment.

Referring to FIG. 1, one cord shield segment 1 of the present system includes two cord shield segment members 10. Each segment member 10, in the preferred embodiment, constitutes one-half of a cylindrical conduit. When two segment members 10 are snapped together, they form a cylindrical conduit 12 with a central channel through which a standard, household electrical cord (not shown in the drawings) may be extended.

Figure 4:
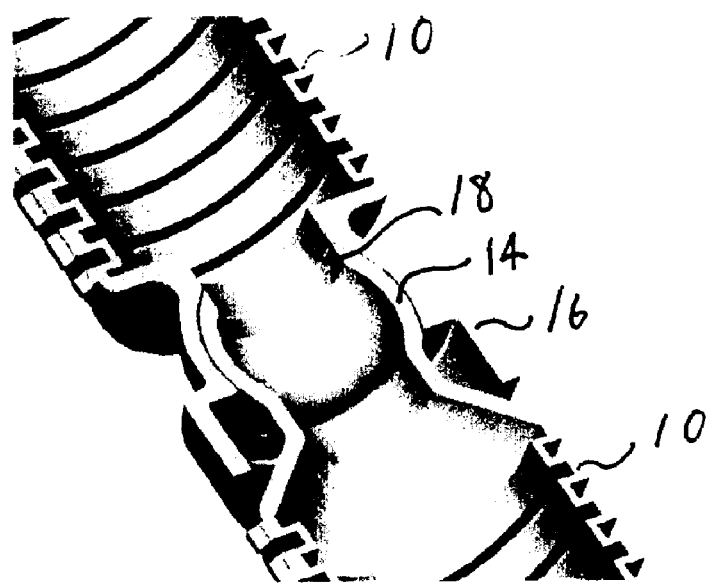
FIG. 4 is a perspective view of the male and female junction members of two cord shield segment members (as opposed to four, as in ordinary use) which segment members are interfaced as when complete cord shield segments are joined.

Referring principally to FIGS. 1 and 4, at first and second ends respectively of each segment member 10 are male segment junctions 14 and female junctions 16. Both male segment junctions 14 and female junctions 16 are, in the preferred embodiment, formed in concert by the two segments members 10 which form any one cord shield segment 10. When assembled, the components of each male segment junction 14 and female junction 16 define a cord orifice 18 through which an electrical cord may extend from one cord shield segment to another. As reflected, in part, in FIG. 4, any number of cord shield segments 12 may be assembled in serial fashion to form a cord shield of any desired length. The nature of interaction between adjacent cord shield segments 12, by way of male segment junctions 14 and female junctions 16, is clearly depicted in FIG. 4, even though such is a cross-sectional view of such interaction.

Figure 2:
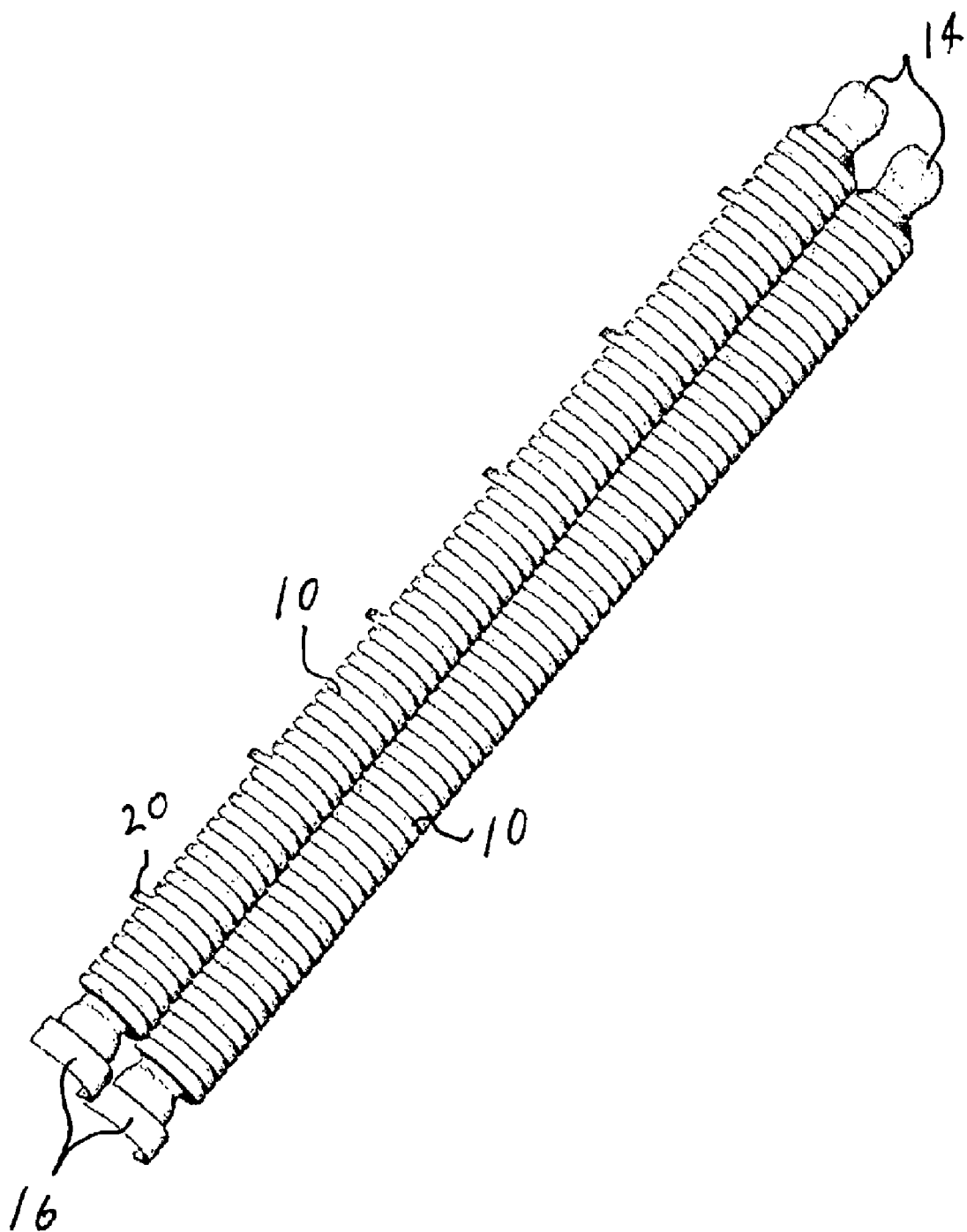
FIG. 2 is a perspective view of the outer surfaces of two adjacent cord shield segment members which, if snapped into intended configuration, will assume the configuration of a complete cord shield segment of FIG. 1.
Figure 3:
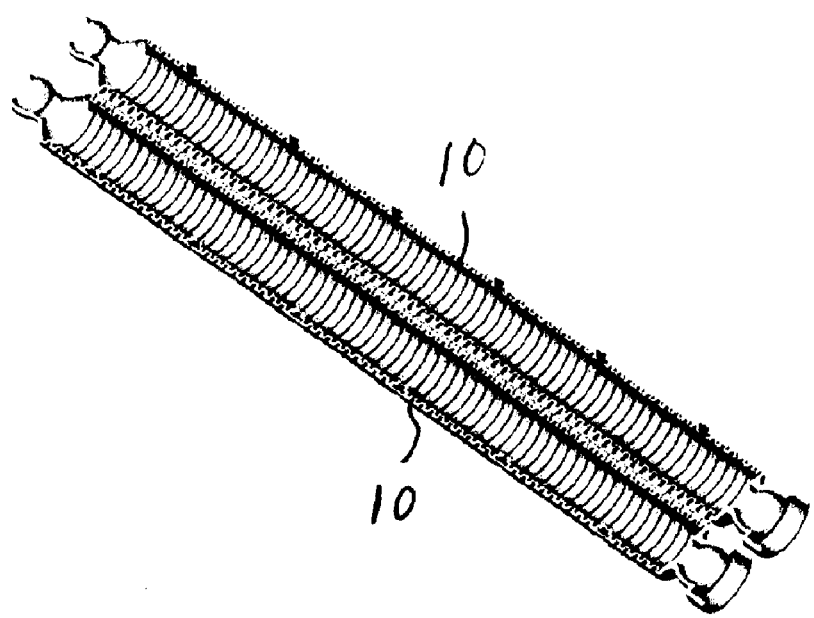
FIG. 3 is a perspective view of the interior surfaces of two adjacent cord shield segment members which, if snapped into intended configuration, will assume the configuration of a complete cord shield segment of FIG. 1, such view showing the portions of the central channel through which an electrical cord will extend as defined by the two cord shield segment members.

Referring in combination to FIGS. 1 and 2, cord shield segment members 10 are, in the preferred embodiment, made to interface in a snap-together manner. Snap tabs 20 and snap tab recesses 22 are complimentarily shaped and positioned to achieve this functionality.

It is expected that vacuum molding from plastic materials will be the preferred mode of manufacture for embodiments of the present invention. However, alternative modes of manufacture and/or materials may appear to persons skilled in the plastics manufacturing arts.

As shown in the drawings, the annular surfaces of cord shield segment members 10 are formed for allowing partial bending to accommodate desired path preferences for users. However, it should be understood that shields with smooth surfaces, not intended or configured for bending, will fall within the scope of the present invention if such otherwise include the features of at least some of the appended claims.

Use of the present cord shield system is straight forward: One lays a length of electrical cord along the channel half of a first shield segment member 10, and then snaps a second shield segment member 10 to the first shield segment member 10 to form a closed conduit. This is repeated as appropriate to the length of cord to be shielded. As successive shield segments 12 are applied to the electrical cord, they are snapped together, with male segment junctions 14 joining female junctions 16 as described and shown above.

As and when need for cord protection passes, the cord shield system may be readily removed.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A cord shield system comprising:

at least two cord shield segment members, said cord shield segment members being removably joinable to each other to form in concert an elongate enclosure which cooperatively defines a central channel which is sized and shaped for receiving therethrough an electrical cord.

2. The cord shield system of claim 1 wherein said cord shield segment members are formed at first and second ends, with cord shield segment junction means for removably attaching successive cord shield segments to form a serial assemblage of cord shield segments, each said cord shield segment junction means defining an orifice for admitting said electrical cord therethrough.

* * * * *